Patented Sept. 29, 1936

2,055,503

UNITED STATES PATENT OFFICE 2,055,503

FUEL COMPOUNDS AND PROCESS OF MAKING THE SAME

Ira C. Nourse, Tulsa, Okla.

No Drawing. Application March 5, 1934, Serial No. 714,130

12 Claims. (Cl. 44—9)

My invention relates to a composition of matter and process of making the same with liquid hydrocarbon fuels such as a liquid petroleum fuel, and more particularly such of the lighter hydro-carbons, or an alcohol or an alcoholic fuel, and has for its objects; to prevent or lessen corrosion of, or the formation of gums and resinous deposits in, the apparatus wherein said fuel is employed and to obtain a more perfect combustion of said fuel whereby the formation of carbon will be prevented or lessened.

With the above and other objects in view which will appear as the description proceeds, my invention consists in the novel features hereinafter set forth in detail and more particularly pointed out in the appended claims.

For the attainment of said objects I provide a nitrate composition adapted to be mixed with said fuel, which when so mixed provides in said fuel a neutralizing agent for acids present in it, or which may be formed therefrom during its combustion, and also provides additional oxygen in it from my oxygen bearing composition for utilization in the combustion.

The preferred form of my composition and which may be more or less varied as its use may require, is dried cadmium nitrate, 16 milligrams; isopropyl alcohol, .5 milliliter; benzol, .5 milliliter; potassium bromide, 4 milligrams; potassium hydroxide, 4 milligrams, per milliliter of the product or compound; any one of which may be changed or altered by as much as 50% over or under and still be, to some practical extent, productive of the desired results. For instance I may use 16 milligrams cadmium nitrate, .75 milliliter isopropyl alcohol; .25 milliliter benzol and 4 milligrams potassium hydroxide and 4 milligrams potassium bromide, or we may use 24 milligrams more or less of cadmium nitrate, .25 milliliter isopropyl alcohol, .75 milliliter benzol, 4 milligrams potassium hydroxide, 8 milligrams potassium bromide. I have found in practice that the relative amounts of the respective ingredients may vary widely without seriously hampering the making of a composition which will effect practical results, although its efficiency will vary.

The mixture is purely mechanical and is subsequently distilled, forming a finely divided suspension of cadmium nitrate in the isopropyl alcohol and benzol mixture which distills over, also carrying with it a small amount of bromide which helps further subdivide some of the cadmium oxide compounds into the more fine bromide products on combustion, however, the fine character of the cadmium oxide is such that it may be satisfactorily disposed of without the use of the potassium bromide. The function of the potassium hydroxide introduced is to act as an additional drying agent for which use sodium hydroxide may be substituted without deleteriously affecting the maintenance of the cadmium nitrate in solution or suspension. The caustic, e. g. potassium hydroxide or other hydroxides such as sodium hydroxide, is preferably used to further reduce the water content of the compound so that there will be little or no water for the dehydrated cadmium nitrate to absorb, and that might cause it to revert to a crystalline state, in which it would fall out of solution i. e. precipitate. The bromide of potash, while not necessary, is of benefit and is preferred and bromide of sodium may be substituted therefor, and preferred when sodium hydroxide is used instead of potassium hydroxide.

The dried cadmium nitrate apparently stays perfectly in solution in the isopropyl alcohol, but the addition of the benzol reduces the tendency of the cadmium nitrate to absorb moisture and thereby holds the cadmium nitrate indefinitely in solution or suspension. I have used cadmium nitrate in the dried pure form in conjunction with isopropyl alcohol and substituted toluene for benzol in the same or in increased proportions and with the same method of preparation as above set forth, with equally good results. A nitrate of uranium in about the same proportions may be used instead of cadmium nitrate. I employ a blending agent, such as isopropyl alcohol or preferably benzol and isopropyl alcohol, combined together by distillation. This blending agent, I find useful also as a softener and a semi-solvent of hard crystalline carbon deposits and that is particularly effective for the solving of gummy and resinous compounds frequently found in various hydro-carbon fuels.

The nitrates of both cadmium and of uranium I have found useful in enhancing combustion owing to the liberation of additional oxygen upon breaking up into their oxides which latter oxides further aid in the combustion by being raised in temperature promoting the further heating up of the combustible mixture of air, fuel and additional oxygen supplied by the nitrates. This promotes a more perfect combustion, prevents or tends to prevent the formation of carbon monoxide gas, and assists in the removal of carbon deposits. Other nitrates such as aluminum nitrate, iron nitrate or potassium nitrate may be used instead of those above mentioned.

The amount of the compound, as made according to the above stated preferred formulae, to be added to one gallon of the liquid hydro-carbon fuel varies from 1 to 3 or more milliliters, depending on the preponderance of the carbon constituents over the hydrogen, the more carbon the more compound to be used, 1 milliliter being ordinarily satisfactory in the average grade of gasolines. When used with an alcohol fuel, the amount would be somewhat less.

In making my composition I thoroughly dry cadmium nitrate to deprive it of water of crystallization, and mix it in the dehydrated isopropyl alcohol. I then add the benzol to the mixture and then add the caustic potash and bromide of potash. All of these substances may be of commercial grade. I then place or pour this mixture into a suitable still, and distill it at a temperature of approximately 180° Fht. at atmospheric pressure, or at an equivalent temperature under a vacuum or under pressure. I condense the resulting vapors which condensate is my finished product.

Uranium nitrate substituted for the cadmium nitrate in the above procedure also makes a carbon eliminator compound, the amount used being approximately the same per gallon of fuel, and its actions being analogous to those of cadmium nitrate.

It is important that anhydrous or water free chemicals be used as the success of its use in hydrocarbon fuel, especially in the petroleum fuels when not immediately used after the introduction of my compound, depends upon the absence of or an elimination to a very small percent, 1% or thereabouts, of water in the compound to prevent the precipitation of the nitrate. In alcohol fuels, the benzol is not necessary, owing to the soluble nature of the fuel itself.

In place of the isopropyl alcohol as a solvent and binding agent I have employed butyl alcohol in the manner and amounts as above mentioned. I find that a mixture of nitro benzol and isopropyl alcohol in about equal volumes is useful for degumming with similar results as the above mentioned compounds or compositions of matter but not as effective as with the cadmium and uranium compounds incorporated therein.

Having thus fully disclosed my invention, what I claim and desire to secure by Letters Patent, is:

1. A motor fuel composition containing in approximate proportions per milliliter of addition agent the following: basic cadmium nitrate, 16 milligrams; isopropyl alcohol, .5 milliliter; benzol, .5 milliliter; potassium bromide, 4 milligrams; potassium hydroxide, 4 milligrams.

2. As a new motor fuel composition, a distillate derived from a mixture of cadmium nitrate, isopropyl alcohol and benzol.

3. A homogeneous gasoline fuel comprising gasoline and a petroleum soluble aliphatic alcohol suspension of a metallic inorganic nitrate of the heavy metals of the character of cadmium nitrate.

4. A liquid fuel having added an agent comprising at least one of the nitrates selected from the group consisting of cadmium nitrate, uranium nitrate, aluminum nitrate, iron nitrate, and potassium nitrate in anhydrous solution.

5. The process of making a fuel addition agent which includes the steps of mixing a substance having the characteristic of dry cadmium nitrate with a dehydrated alcohol, benzol, caustic potash, and potassium bromide, and distilling the mixture at approximately 180° F.

6. Those steps in the process of making a motor fuel addition agent which comprises dissolving a nitrate from a group consisting of cadmium nitrate, uranium nitrate, aluminum nitrate, iron nitrate, and potassium nitrate in an anhydrous solution, distilling and condensing the product, whereby finely divided particles are homogeneously suspended.

7. The process of making an improved motor fuel which comprises admixing a dry metallic nitrate with an alcoholic solvent having the characteristics of isopropyl alcohol and a moisture inhibiting agent having the characteristics of benzol and a moisture absorbent having the characteristics of potassium hydroxide, distilling the mixture and adding the distillate to a motor fuel.

8. A new gasoline fuel including a homogeneous suspension of anhydrous basic cadmium nitrate.

9. A liquid fuel containing an anhydrous homogeneous suspension of a metallic salt of the character of cadmium nitrate containing dissociable oxygen in a petroleum soluble aliphatic alcohol.

10. A liquid fuel addition agent containing in approximate proportions per milliliter basic cadmium nitrate, 16 milligrams; isopropyl alcohol, .5 milliliter; benzol, .5 milliliter; potassium bromide, 4 milligrams; potassium hydroxide, 4 milligrams; the said addition agent being useful in the proportion of 1 to 2 cc. per gallon of liquid fuel.

11. The method of preparing a fuel addition agent which comprises the steps of adding to isopropyl alcohol a dried metallic inorganic nitrate of a heavy metal, mixing the same with a benzol solution containing potassium bromide and caustic potash at a temperature approximately 180° F. and condensing the distilled product.

12. The method of preparing a liquid motor fuel which comprises distilling a mixture of a metallic composition having the motor fuel benefitting character of cadmium nitrate in a solvent at a temperature below the boiling point of the composition, and adding the distillate to a motor fuel base, whereby the metallic composition is incorporated in finely divided homogeneous suspension in the completed motor fuel.

IRA C. NOURSE.